Figure 1:
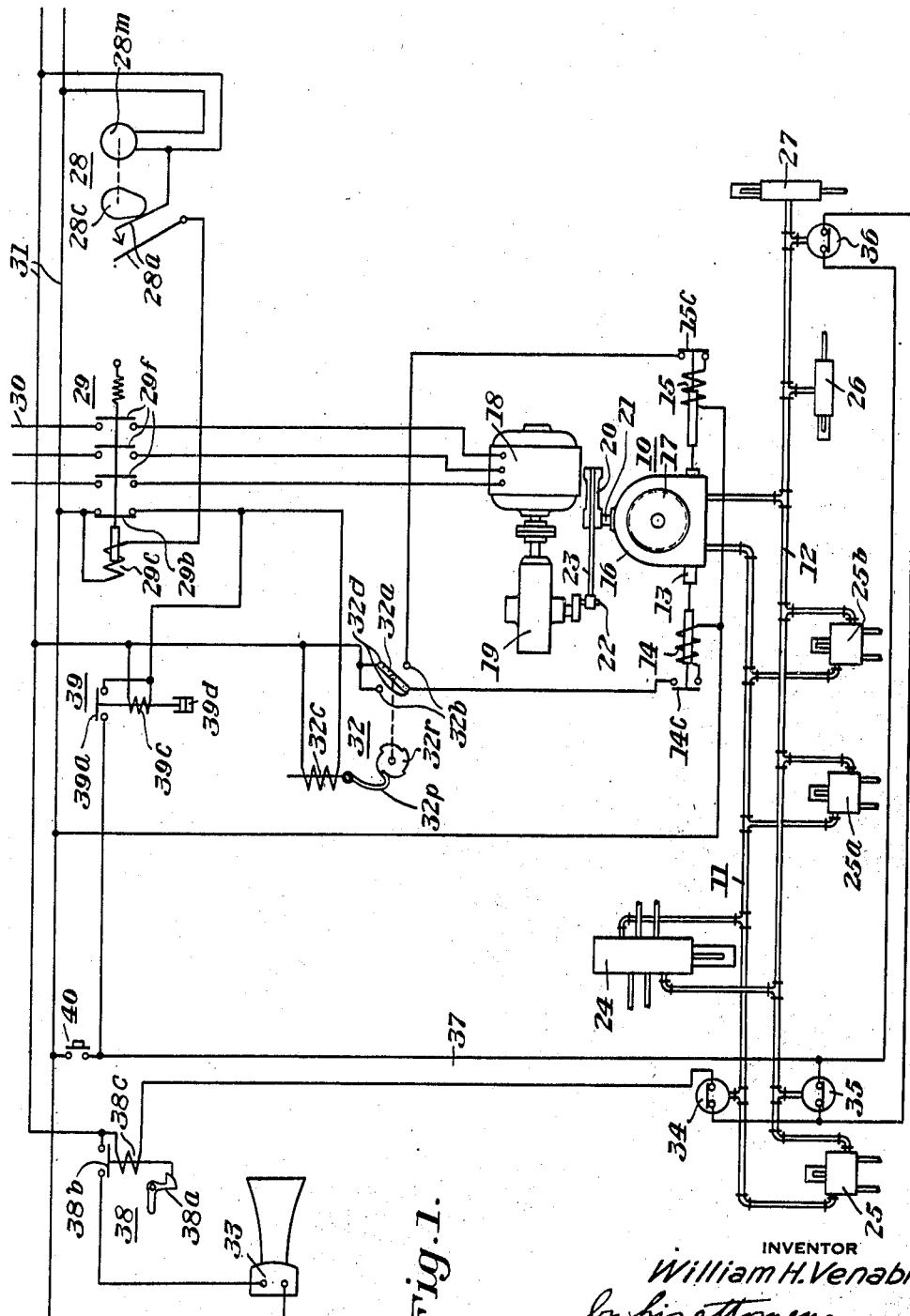

INVENTOR
William H. Venable
by his attorneys
Stebbins and Blenko

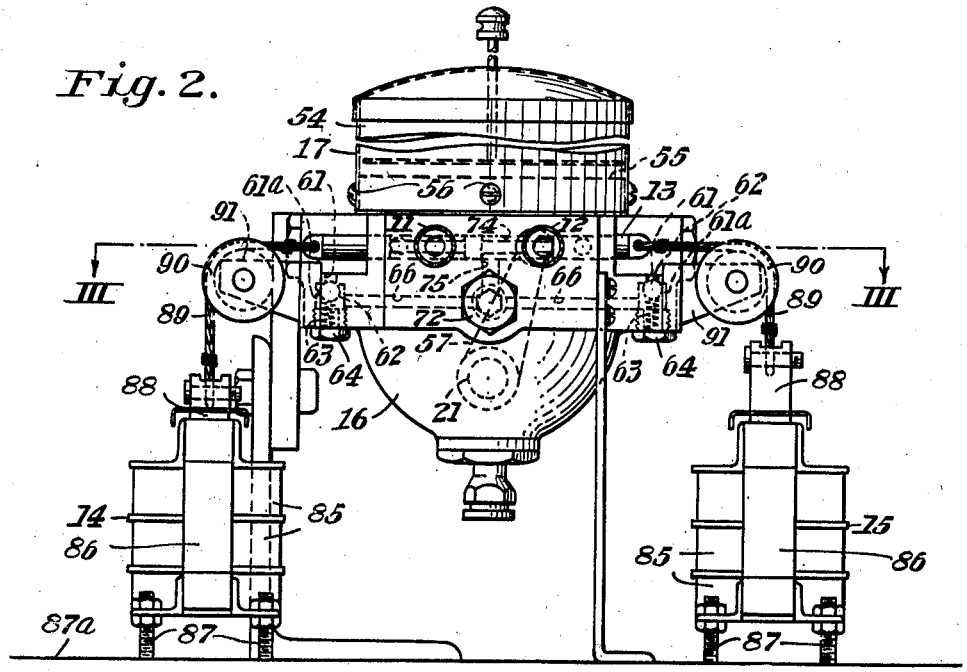

Patented Jan. 18, 1944

2,339,532

UNITED STATES PATENT OFFICE 2,339,532

INDICATOR FOR LUBRICATING SYSTEMS OR THE LIKE

William H. Venable, Pittsburgh, Pa., assignor to Blaw-Knox Company, Pittsburgh, Pa., a corporation of New Jersey Application January 20, 1942, Serial No. 427,434

5 Claims. (Cl. 184—7)

This invention relates to an indicator for a fluid-distribution system. While the invention is applicable to various types of such systems, it is herein disclosed in connection with a lubricant-distributing system.

Lubrication systems including distribution pipes and "dosers" or measuring devices operable automatically in response to the alternate application and release of pressure to pipe lines, are in general use. The dosers are located as close as convenient to the bearings to be lubricated and all that is required to dispense a measured quantity of lubricant from each doser is the application of pressure to the lubricant in the doser. Lubricating dosers of this character are generally provided with either one or two inlets, depending on whether the doser is provided with a restoring spring or with piston valves operable by the alternate application of pressure at two different inlets.

In lubrication systems the usual practice is to apply to each bearing successive equal doses, a large number of bearings being thus serviced at each operation of a grease pump which is started periodically at regular predetermined time intervals. The pressure supplied by the pump should be kept on the pipe system long enough to operate every dosing device, and should be high enough at the pump to operate that valve which is most difficult to operate because farthest from the pump or requiring the most pressure to lubricate its bearing. When every dosing device has operated the grease pressure should be released, to prevent leakage through the dosing devices.

The number of dosers connected to a lubricating system of the type mentioned may vary from relatively few to several hundred and the location of the bearings may be such that periodic inspection is difficult or laborious. Because of the expansion of the piping under the high lubricant pressures and possibly to some slight compressibility of the lubricant, and the unavoidable leakage, which is variable, it is not feasible to rely on the volume of the grease supplied to the system, for assurance that all the dosers have operated properly to supply the required amount of lubricant. Because of the leakage, it is undesirable to maintain delivery pressure on the lubricant constantly. For this reason, the pump is preferably operated only at appropriate intervals, for a period, the sufficiency of which is determined from time to time as occasion may require. In a typical system, for example, the pump may be started to apply pressure to the system once each hour, and the pressure may be kept on for a period of one to six minutes, as may be found necessary by trial.

Due to the expansion of the piping under the high lubricant pressures and possibly to some slight compressibility of the lubricant and to the large volumetric capacity of the distributing pipes as compared with the total volume of all doses applied at one operation, there is considerable back-flow through the pipe line when the pressure is relieved at the pump end of the pipe line, and the dosers nearest the pump are actuated by the increasing pressure on the lubricant before the pressure at the more remote dosers is sufficient to operate them. While means have been previously devised for insuring continuance of the pump operation until a predetermined pressure has been attained at some initial point on the pipe line, there hitherto has been no means provided for giving notice if adequate pressure at such point was not attained within a reasonable period of pressure application at the supply end of the pipe line.

I have invented a novel indicating system for lubricant-distribution systems which is quite simple and utilizes standard control elements but is positive in operation so that it may safely be relied upon to reveal the failure of the pressure of the lubricant in any part of the system to reach the value necessary to operate the dosers properly, before the pressure at the supply end of the pipe line is released. To achieve this objective, I employ devices connected to the distribution pipes, which are responsive to the pressure on the lubricant therein. My invention operates to give an indication to an attendant and thus insures that immediate steps will be taken in case the desired pressure has not been attained at all critical points on the pipe line before the supply pressure has been released. A leak in any portion of the system, whether resulting from a defect in the pipe line or wear of the moving parts, which prevents the attainment of the necessary pressure, causes operation of the indicator as well as any other reason for failure of the pressure on the lubricant to build up to the required value, such as slow movement of the lubricant resulting from diminished fluidity due to seasonal change in temperature.

In a preferred embodiment, the invention comprises several auxiliary devices in combination with the elements of a conventional lubricant-distributing system. Such a system includes a pump, operating means for the pump, e. g., a motor and control devices therefor, and, if automatic operation is desired, a timing mechanism for controlling the pump-operating means. If the lubricant system is of the pressure-reversing variety, there is also required a transfer or two-way valve to shift the pump from one pipe to the other. In combination with the foregoing, I provide a plurality of pressure-responsive switches connected to the distribution pipe lines. These switches are normally in position to cause operation of an indicator but are actuated to a position in which they prevent operation of the indicator, on building up of the pressure in the distribution pipes to the value necessary to operate the dosers connected thereto. I also provide auxiliary means controlling the operation of the indicator, effective to make a momentary or "check" closure of the indicator circuit when the pressure-responsive switches should be open and preventing them from causing operation of the indicator after the end of the pump operation when the pressure decreases and the pressure switches return to normal or closed position.

A complete understanding of the invention and its advantages may be gained from the following detailed description and explanation which refer to the accompanying drawings illustrating a preferred embodiment. In the drawings, Figure 1 is a view showing diagrammatically a lubricant-distribution system having the indicator of my invention incorporated therein;

Figure 2 is a side elevation of a pump-and-valve mechanism which I prefer for delivering lubricant under pressure to the distribution pipes; and Figure 3 is a horizontal section through the pump-and-valve mechanism, taken along the plane of line III—III of Figure 2.

Referring now in detail to the drawings, the pump-and-valve mechanism is indicated generally at 10 and has outlets to which are connected distribution pipes 11 and 12. The mechanism 10 includes a valve 13 effective to connect the pump proper alternately to the pipes 11 and 12. The valve 13 is reciprocated from one of its extreme positions to the other by solenoids 14 and 15.

The mechanism 10 includes a body 16 surmounted by a reservoir 17 and is driven by a motor 18 through a gear reducer 19. The low-speed shaft of the reducer drives an oscillating arm 20 on a shaft 21 journaled in the body 16, through a crank 22 and link 23.

Grease dosers of various types are connected to one or both of the pipes 11 and 12. Doser 24 is of the type shown in Venable application Serial No. 404,477 while the dosers 25, 25a and 25b are of the type shown in Venable application Serial No. 404,476. Dosers 26 and 27 are of the type shown in Venable Patent 2,184,172. Alternatively, the dosers 24, 25a and 25b may be of the type shown in Figures 3 and 4 of Dirkes Patent 1,995,342. Dosers of these and other types are now on the market and a detailed description thereof is unnecessary. While several types of dosers have been indicated schematically in the drawings and while still other types may be used as readily, it will be understood that the doser for each particular bearing will be chosen in accordance with the needs of the bearing in question.

The motor 18 is controlled by a timer indicated generally at 28, and a contactor 29. When operated, the main contacts 29f of the contactor connect the motor directly to a supply circuit 30. The timer includes a motor 28m, a cam 28c driven thereby and contacts 28a adapted to be closed by the engagement of the cam with one of them.

The motor 28m is connected to a supply circuit 31 for energizing the control system and indicator to be described hereinafter. When the timer operates to close the contacts 28a, an obvious energizing circuit is completed for the operating coil 29c of the contactor 29.

The operation of the timer also indirectly controls through contactor 29 a ratchet relay 32 which functions to energize the solenoids 14 and 15 alternately. This relay includes an operating coil 32c, a ratchet wheel 32r, a pawl 32p and a rotating contact arm 32a adapted alternately to bridge pairs of opposed contacts 32b and 32d.

The operating coil of the relay 32 is energized when the contactor 29 is in de-energized position by its auxiliary contact 29b which establishes an obvious energizing circuit for the coil. The circuits for the solenoids 14 and 15 include interlocking contacts 14c and 15c, each contact being opened when the solenoid is energized, after the solenoid plunger has moved to seal the magnetic circuit, thus to break the solenoid circuit after completion of its operating stroke. As is well known, some such provision is common for direct-current solenoids, but is not essential for alternating-current solenoids, and may be omitted if alternating current is used.

The indicator which I provide for revealing the failure of the pressure to build up in any portion of the pipes 11 and 12 to a value sufficient to operate the dosers connected thereto, as illustrated herein is a horn or siren 33 but could be any other desired form of indicating device. The indicator is controlled by a plurality of pressure-responsive switches some of which are shown at 34, 35 and 36. These switches are of known construction and have contacts which are normally closed but open in response to the application of predetermined pressure. The switches are connected to the pipes 11 and 12 so their operating mechanisms are subject to the pressure on the lubricant therein, and are preferably located at points in the distribution system remote from the pump. The number and location of the switches depends on the extent and arrangement of the distribution pipes 11 and 12 and should be such that the switches are not opened until the pressure of the lubricant in all parts of the system simultaneously under the pressure applied has built up to the value necessary to operate the dosers. The switches, of course, will be adjusted for operation at this pressure and various different pressures may be required in different parts of the system because of variables such as leakage, friction, etc.

The switches connected to the same distribution pipe, e. g., the switches 35 and 36, are connected in parallel to a control circuit 37. The two parallel-connected switches 35 and 36, furthermore, are connected in series with the switch 34 or with a plurality of similar switches themselves connected in parallel, if more than one such switch is connected to pipe 11. The circuit 37 includes a horn relay 38 of the latching type, i. e., it is held in operated position after energization of its coil 38c by a mechanical latch 39a. It will be apparent that the relay 38 when operated closes an obvious energizing circuit for the horn 33 through its front contact 38b.

The circuit 37 is also controlled by a time-delay rely 39 of any suitable type which closes its contact when de-energized. Whatever the type, the character of the relay is indicated by the dashpot 39d. The operating coil 39c of the relay 39 is energized by auxiliary contact 29b of contactor 29; and the contact 39a, which breaks presently after coil 39c is energized, is in series with contact 29b and the pressure-switch circuit previously described. The purpose of the relay 39 is to permit completion of the control circuit 37 for a short time after closing of the contact 29b, if any pressure switch connected to the pipe to which pressure was last applied, remains closed, yet maintain the control circuit 37 disconnected from its energizing source at all times except during a short interval after the stoppage of the pump. This prevents energization of the horn 33 during the time when the pump is idle and the contacts of the switches 34, 35 and 36 are normally closed. They close after the lapse of a predetermined time following a pump operation, as the pressure built up by the pump gradually falls because of back-flow in the supply line. The relay 39 is shown with its contact 39a open since its coil 39c is energized when contact 29b of contactor 29 is closed, as shown.

A manually operated switch 40, illustrated as of the push-button type, is connected in shunt with the contacts 29b and 39a, between the circuit 37 and one of the conductors of supply circuit 31. The switch 40 permits a manual momentary or "check" closure of the circuit 37 to determine the condition of the pressure-responsive switches.

A complete operating cycle of the system described above will now be explained assuming that all the elements initially occupy the positions in which they are illustrated in Figure 1. At a predetermined time after the last lubricant-delivery operation, the timer 28 closes its contacts 28a thus energizing the operating coil 29c of the contactor 29. Operation of the contactor connects the motor 18 to its supply circuit whereupon the motor starts and drives the pump. The opening of the auxiliary contact 29b of the contactor 29 de-energizes the operating coils of the relays 32 and 39. The pawl 32p of the former drops and the contact 39a of the latter closes.

Operation of the pump supplies lubricant to one or the other of the pipes 11 and 12 depending on the position of the valve 13. As the pressure builds up in the pipe to which the pump is delivering, the dosers connected to that pipe operate to deliver measured amounts of lubricant to the bearings with which they are associated. The pressure-responsive switches 34, 35 and 36 connected to the pipe to which pressure is applied also operate to open their contacts. Assuming first that pipe 12 is the one to which the pump is delivering lubricant, both switches 35 and 36 will open provided the pressure on the lubricant in the pipe at the points to which the switches are connected is sufficient to operate the dosers such as 25, 26 and 27. If the pressure does not build up to the required value at the points to which the switches are connected, their contacts remain closed.

The pumping, of course, continues throughout such time as cam 28c of the timer 28 maintains the contact 28a closed, during which time contactor 29, and consequently motor 18, are energized. Preferably this interval is adjustable, by use of a suitable adjustable timer. During this interval, contact 29b being open, the circuit 37 is de-energized; but the operator may, of course, at any time check the pressure in the system by manually closing contact 40. At the end of this time interval, contactor 29 is de-energized, and a momentary closure of circuit 37 automatically takes place upon the closure of contact 29b, through contact 39a in the time-delay relay 39, which, coil 39c being at this instant energized, presently opens. At such time as the circuit 37 is thus energized, manually or automatically, the switches 35 and 36 will be open if sufficient pressure has been built up in the pipe 12 to operate all the dosing devices, thus preventing completion of the circuit 37 to energize the relay 38 which controls the horn 33. Switch 34, of course, is closed at this time, there being no pressure in pipe 11.

Should the pressure in the pipe 12, however, fail to build up to the required value in the neighborhood of either of the switches 35 and 36, either or both will remain closed so that a circuit will be prepared for energizing the relay 38 on closing of either contact 29b or 40. In the regular course of the lubricating cycle, the circuit 37 through contact 29b to the signal is completed by the opening of the timer contacts 28a after the end of the predetermined period of pump operation. This circuit extends from the lower conductor of the supply circuit 31, through the auxiliary contact 29b, the contact 39a, while it remains closed, one or both the switches 35 and 36, the switch 34, the coil 38c of the relay 38 and thence to the other side of the supply circuit. The relay 38 thereupon operates immediately and closes the circuit of the horn 33. This gives an immediate indication to the attendant that proper pressure for operating the dosers has not been attained at some point in the system, and that an inspection should be made.

Regardless of whether a signal is given or not, the cycle continues with the reversal of valve 13, as will presently be described in detail. But at this point, it is apparent that, if the required pressure has been previously reached and all the dosing devices have been operated thereby, there is no outlet for lubricant from the pipes, and the pump must operate, for a short time at least, without discharging any substantial quantity of lubricant into the pipe lines. I employ in the practice of my invention, especially as embodied in a reversing system, mechanical apparatus in conjunction with the signal devices, whereby lubricant is delivered to the pipes at the times desired, excessive pressure due to cessation of flow is avoided, and the pressure is released at the particular time desired; as well as means for alternating the pressure applied to the pipe lines. Preferred apparatus for these purposes, and the manner in which I employ it in my invention, will be described and explained upon conclusion of the description of the electrical circuit shown in Figure 1.

The closing of the auxiliary contact 29b on opening of the contactor 29 to stop the motor 18, energizes the operating coils of relays 32 and 39. The relay 32 operates to turn the rotating arm 32a thereof so that it bridges the contacts 32b, thus closing the circuit for the solenoid 15. On energization of the solenoid, the valve 13 is actuated to its other extreme position, the circuit of the coil 15 is opened at the contact 15c, and the circuit of the coil 14 is prepared for the next operation by closure of the contact 14c. Relay 39 operates to open its contact 39a (which closed when contactor 29 was operated) within a short time after the contactor 29 opens. This prevents false operation of indicator as the contacts of the switches 34, 35, 36 return to closed position by reason of the gradual decrease of the pressure on the lubricant in the pipe line after stoppage of the pump. After opening of the contact 38a, tripping of the latch 38a will permit opening of the contact 38b of the relay 39 to shut off the horn 33 if it has been operated.

The operation described above will be repeated on the next closure of the timer contacts 28 except that lubricant will be supplied to the pipe 11 instead of to pipe 12. It will be apparent that the combined effect of the closure of contact 29b and operation of the relay 39 is to effect a momentary closure of circuit 37 as a check on the condition of the switches 34, 35 and 36.

The switch 40 may be operated manually to check conditions when the circuit 37 is normally open, as during the pumping operation. It may thus be used in adjusting the timer 28 for the proper setting of the time of operation of the motor 13. For example, the switch 40 may be closed on the lapse of a definite time after closure of the contacts 29a to determine whether the pressure has been built up sufficiently to operate the pressure-responsive switches. In this way, the minimum time of pump operation necessary to produce the desired pressure may be determined and the timer set for a time somewhat greater. It may be desirable to change this setting from time to time because of changes of temperature or changes in the grade of lubricant used.

The switch 40 also typifies an alternative to the use of the relay 39 as above explained, in making a momentary check closure of the circuit 37 after operation of the pump.

In order to make clear the operation of the pump-and-valve mechanism 10, it is illustrated in detail in Figures 2 and 3. This mechanism is also disclosed and claimed in an application of Edward P. Denigan, Serial No. 427,433, filed Jan. 20, 1942, for Fluid-supply apparatus.

The body 16 is somewhat bowl-shaped and has a relatively thick rim. The shaft 21 is journaled in a transverse bore through the body near the bottom thereof. Cylindrical bosses 46 project inwardly from the wall of the body 16 from diametrically opposed locations and are bored axially to provide pump cylinders 47. The ends of the bore through the bosses 46 are counter-bored and tapped to receive closing plugs 48. A piston 49 has its ends slidably received in the cylinders 47. The piston has a reduced central portion 50. An arm 51 secured to shaft 21 by a pin 51a is rounded and bifurcated at its upper end, providing spaced bearing portions 52, one on each side of the reduced portion 50 of the piston, adapted to engage the spaced shoulders 53 formed by the latter. By this construction, oscillation of the shaft 21 causes reciprocation of the piston 49.

The body 16 is open at the top and the reservoir 17 is open at the bottom. The reservoir comprises a cylindrical shell 54 secured to a flange 55 upstanding from the body 16, by screws 56. By virtue of the construction of the body 16 and reservoir 17 described above, the interior of the body is maintained full of fluid at all times since it is in direct communication with the reservoir. The ends of the bosses 46 are slotted as at 60 to provide inlets through which fluid may flow into the cylinders 47. As the piston is withdrawn from either cylinder, a vacuum will be created therein because of means to be described later. When the end of the piston clears the slot 60, fluid will immediately fill the cylinder.

Outlet ports 61 are drilled into the periphery of the body 16 from below and communicate with the counter-bores at the outer ends of the cylinder bore. The outlet ports are counter-bored as at 61a to form seats for ball check valves 62. These valves are held against their seats, subject to displacement by fluid discharged through the outlet ports, by springs 63 carried in plugs 64 threaded into the counter-bores 61a.

The wall of the body 16 has a radial bore or cored recess 65 providing a relief valve chamber. Cored passages or ducts 66 in the wall of the body have a junction in the chamber 65 and communicate with the counter-bores 61a respectively. A relief port 67 communicates with the chamber 65 and the interior of the body 16. A relief valve 68 is normally maintained seated against the outer end of the port 67 by a compression spring 69 on the stem of the valve indicated at 70. The spring bears on the inner end of the chamber 65 and on adjusting nuts 71 threaded onto the outer end of the valve stem. A plug 72 closes the outer end of the chamber 65 and is recessed at 73 to receive the end of the valve stem. It will be apparent that the valve 68 operates when the pressure in the chamber 65 becomes excessive, to open the chamber to the interior of the body 16 in which the pressure on the fluid is only that caused by the head of the fluid above the valve port 67. In the lubricating system herein described, providing that the pump is always operated a predetermined time, some lubricant is pumped through valve 68 just prior to the end of the pumping period after the dosing devices have operated, the dosing devices not then being outlets from the pipe lines, and the lubricant in the pipes then being under pressure. The valve 68 provides that the pump will not be required to put lubricant under pressure beyond the pressure determined by spring 69, and prevents overloading the pump as well as dangerous stresses in the apparatus due to excessive pressure.

It will be apparent from the foregoing description that on reciprocation of the piston 49, fluid is delivered under pressure alternately through the outlets 61, past the check valves 62 and through the passages 66 to the chamber 65. The check valves, of course, prevent reverse flow of fluid on withdrawal of the piston from either cylinder and maintain the aforementioned vacuum which causes the cylinders to be filled with fluid as soon as the inlets 46 are uncovered by the ends of the piston.

The piston valve 13 is slidably disposed in a cylinder 74 bored transversely through the wall of the body 16. A vertical passage 75 connects the cylinder 74 to the chamber 65. Outlet or delivery ports 76 and 77 are drilled through the wall of the body 16 and communicate with the cylinder 74 at points spaced along the length thereof. By-passing or return ports 78 and 79 also communicate with the cylinder 74 at points spaced outwardly of the ports 76 and 77 and with the interior of the body 16. Piston 13 fills the bore 74 at end portions 80 and 81 and central portion 82, but is of reduced section in the intermediate portions to afford communication between the ports in the manner desired.

It will be apparent that when the valve 13 is in the position in which it is shown in Figure 3, fluid delivered by reciprocating the piston 49 will pass alternately from opposite ends of the cylinder 47 through passages 61 and 66 into chamber 65 and thence through passage 75 and the portion of the cylinder 74 between the valve portions 81 and 82 into port 77 and the outlet 12. At the same time, the pipe 11 and outlet port 76 are in communication with the by-passing port 78 through the portion of the cylinder 69 between portions 80 and 82. This provides for return of lubricant compressed in pipe 11 to the main supply upon expansion when the pressure is relieved, as it must be in automatic reversing systems wherein the pressure differential across the pipes is the source of power which operates the dosing devices. It is also essential in those single pipe systems, represented in Figure 1 by the branch of pipe 12 in which devices 26 and 27 are shown, which depend upon successive application and release of pressure for their operation.

When the valve piston 13 is in its other extreme position, the pipe 11 and outlet port 76 are in communication with the passage 75 through which fluid is delivered from the chamber 65 by reciprocation of the piston 49, and pipe 12 and outlet 77 are in communication through by-passing port 79 with the interior of the body 16.

The solenoids 14 and 15 for reciprocating the valve 13 include coils 85 assembled in a frame 86 carried on studs 87 extending upwardly from a base 87a. Cores 88 reciprocable through the coils are connected to opposite ends of the valve by cables 89 trained over sheaves 90. The sheaves are journaled on brackets 91 secured to the body 16. By this construction, it will be evident that energization of the coils of the two solenoids alternately will cause the valve 13 to move back and forth between its extreme positions.

It will be apparent from the foregoing description and explanation that the invention provides a simple, inexpensive, yet highly effective and positive indicating system for revealing the failure of the pressure to build up in a distribution system to the value required to operate devices connected thereto. The invention utilizes conventional control elements obtainable at small cost and prevents the continuance, without notice to the attendant, of conditions under which certain dosers of a lubricating system fail to operate, eliminating the chance of serious injury to costly equipment as the result of insufficient lubrication.

While the invention has been described herein as incorporated in a lubricating system which is automatically controlled, it will be evident that the invention may also be applied to distribution systems in which the pump is manually operated or power driven under manual control.

Although I have illustrated and described herein but a preferred embodiment of the invention with certain modifications, it will be recognized that other changes may be made without departing from the spirit of the invention of the scope of the appended claims.

I claim:

1. In a fluid-distributing system including a pump, distributing piping and dosers connected thereto, indicating means for revealing failure of the pressure produced periodically by the pump in said piping to attain the value necessary to operate said dosers, said means comprising pressure-responsive switches connected to said piping, said switches having normally closed contacts which open under the pressure necessary to operate the dosers and close when said pressure is released, a signal circuit, said switches being connected in said circuit, and means operating at the completion of a pumping operation to maintain said circuit momentarily closed and thereby operate the signal if a pressure-responsive switch is closed and then to open said circuit and thereby prevent the giving of a false signal when said switches reclose upon the normal drop of pressure in the piping as a result of the stopping of the pump.

2. In a fluid-distributing system including a pump, pump-control means, distribution piping and dosers connected thereto, indicating means for revealing failure of the pressure produced periodically by the pump in said piping to attain the value necessary to operate said dosers, said means comprising pressure-responsive switches connected to said piping, said switches having normally closed contacts which open under the pressure necessary to operate the dosers and close when the pressure is released, a signal circuit, said switches being connected in said circuit, and means controlled by said pump-control means and operating at the completion of a pumping operation to maintain said circuit momentarily closed and thereby operate the signal if a pressure-responsive switch is closed and then to open said circuit and thereby prevent the giving of a false signal when said switches reclose upon the normal drop of pressure in the piping as a result of the stopping of the pump.

3. In a fluid-distributing system including a pump, pump-control means, distribution piping and dosers connected thereto, indicating means for revealing failure of the pressure produced periodically by the pump in said piping to attain the value necessary to operate said dosers, said means comprising pressure-responsive switches connected to said piping, said switches having normally closed contacts which open under the pressure necessary to operate the dosers and close when said pressure is reduced, a signal circuit, said switches being connected in said circuit, and a time-delay relay controlled by said pump-control means and operating at the completion of a pumping operation to maintain said circuit momentarily closed and thereby operate the signal if a pressure-responsive switch is closed and then to open said circuit and thereby prevent the giving of a false signal when said switches reclose upon the normal drop of pressure in the piping as a result of the stopping of the pump.

4. The apparatus defined by claim 1 characterized by the points in said piping to which certain of said switches are connected being subjected to the application of fluid pressure at substantially the same time and said certain switches being connected in parallel.

5. The apparatus defined by claim 1 characterized by the points in said piping to which certain of said switches are connected being subjected to the application of fluid pressure successively, and said certain switches being connected in series.

WILLIAM H. VENABLE.